(12) United States Patent
Lee

(10) Patent No.: US 11,917,009 B2
(45) Date of Patent: Feb. 27, 2024

(54) SYSTEM FOR CONTROLLING VEHICLE SENSOR AND METHOD OF CONTROLLING SAME

(71) Applicant: HYUNDAI MOBIS CO., LTD., Seoul (KR)

(72) Inventor: Tae Ho Lee, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 5 days.

(21) Appl. No.: 17/657,734

(22) Filed: Apr. 1, 2022

(65) Prior Publication Data
US 2022/0329656 A1  Oct. 13, 2022

(30) Foreign Application Priority Data
Apr. 7, 2021 (KR) ......................... 10-2021-0045217

(51) Int. Cl.
*H04L 67/12* (2022.01)
*H04Q 9/00* (2006.01)

(52) U.S. Cl.
CPC .............. *H04L 67/12* (2013.01); *H04Q 9/00* (2013.01); *H04Q 2209/86* (2013.01)

(58) Field of Classification Search
CPC ...... H04L 67/12; H04Q 9/00; H04Q 2209/86; B06R 16/023; B60R 16/005; B60Y 2400/30
See application file for complete search history.

(56) References Cited

U.S. PATENT DOCUMENTS

| | | | | |
|---|---|---|---|---|
| 5,367,506 A | * | 11/1994 | Inananga | H04R 1/403 369/4 |
| 5,968,100 A | * | 10/1999 | Kayano | B60R 16/0315 701/1 |
| 2003/0222774 A1 | * | 12/2003 | Koenigsberg | B60T 8/885 701/31.4 |
| 2006/0083388 A1 | * | 4/2006 | Rothschild | H04R 3/00 381/80 |
| 2006/0233004 A1 | * | 10/2006 | Furukawa | B60L 58/10 365/1 |
| 2012/0316775 A1 | * | 12/2012 | Hayashi | G01C 21/20 701/428 |
| 2013/0178074 A1 | * | 7/2013 | Inagaki | H04L 1/06 439/55 |
| 2014/0314238 A1 | * | 10/2014 | Usher | H04R 3/04 381/17 |
| 2018/0115855 A1 | * | 4/2018 | Bakish | H04R 1/265 |
| 2019/0084561 A1 | * | 3/2019 | Takeda | B60W 40/072 |
| 2019/0143972 A1 | * | 5/2019 | Ishioka | G08G 1/167 701/70 |

FOREIGN PATENT DOCUMENTS

KR 2012-0053313 5/2012

* cited by examiner

*Primary Examiner* — Travis R Hunnings
(74) *Attorney, Agent, or Firm* — DLA Piper LLP (US)

(57) ABSTRACT

A system for controlling a vehicle sensor, the system including a plurality of sensors provided in a vehicle, a switch module including a plurality of switches connected to the plurality of sensors, respectively, the plurality of switches being connected to the switch module through an integral line; a controller configured to control operation of each of the plurality of switches, the controller being connected to the switch module through the integral line and thus performing communication with the plurality of sensors, and assigning an ID to each of the plurality of sensors in a corresponding manner by selectively connecting each of the plurality of switches thereto.

10 Claims, 2 Drawing Sheets

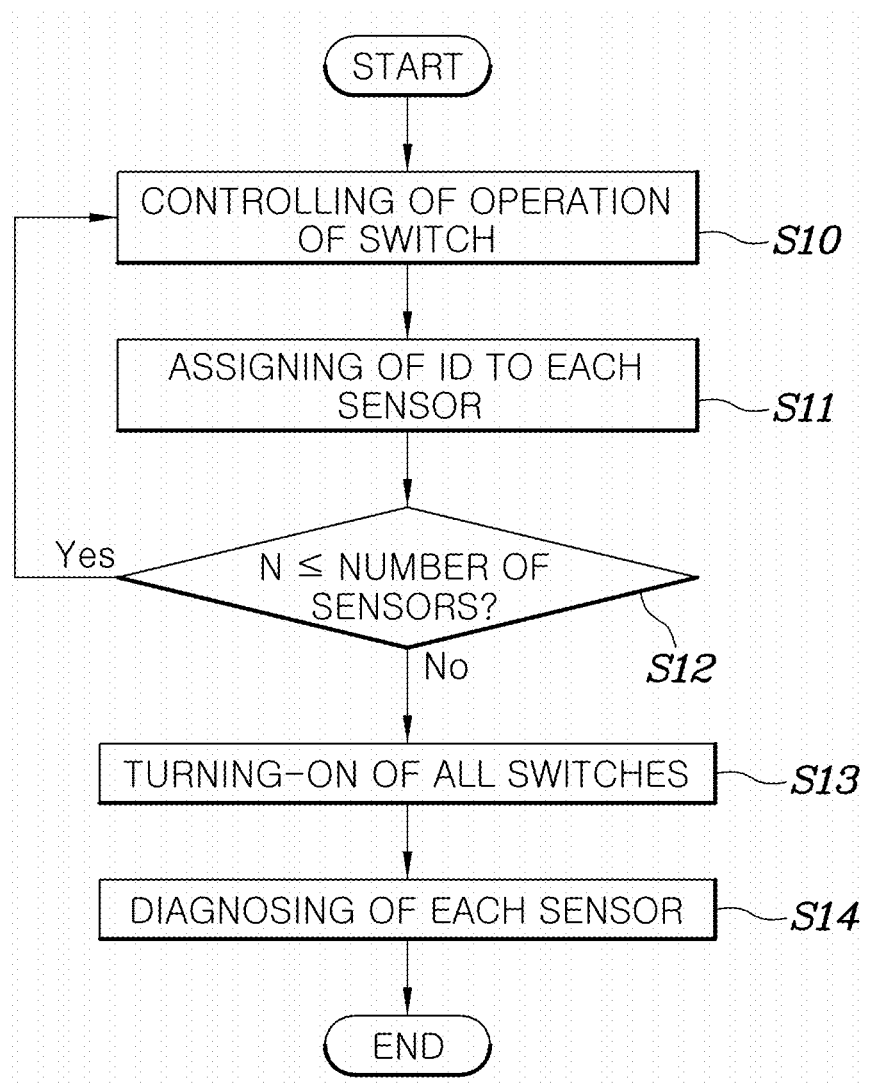

SYSTEM FOR CONTROLLING VEHICLE SENSOR AND METHOD OF CONTROLLING SAME

CROSS REFERENCE TO RELATED APPLICATION

The present application claims priority to Korean Patent Application No. 10-2021-0045217, filed Apr. 7, 2021, the entire contents of which is incorporated herein for all purposes by this reference.

BACKGROUND OF THE INVENTION

Field of the Invention

The present invention relates to a system for controlling a vehicle sensor and a method of controlling the system for controlling a vehicle sensor and, more particularly, to a system for controlling a plurality of sensors and a method of controlling the system for controlling a plurality of sensors.

Description of the Related Art

In recent years, there has been a trend to mount in a vehicle an object-detecting sensor module capable not only of preventing a fender-bending accident while driving the vehicle slowly, but also of more effectively providing a warning when driving the vehicle into a place that is out of a driver's field of vision or when driving the vehicle backward.

The object-detecting sensor module serves to prevent a road accident in which the vehicles involved are only slightly damaged due to a collision by detecting in various ways an object at a blind spot that is out of the driver's field of vision and then providing a warning to the driver.

In recent years, ultrasonic sensors that are used as components of the object-detecting sensor module have been introduced. The ultrasonic sensors determine the presence or absence of an obstacle by emitting an ultrasonic wave and receiving the ultrasonic wave reflected from an obstacle. In addition, a plurality of ultrasonic sensors mounted in the vehicle serve to detect the obstacle in front of or behind the vehicle to protect the vehicle against a collision.

However, the more increased the number of the ultrasonic sensors, the more increased the number of sensor communication channels, the more complicated wiring to a controller controlling each of the ultrasonic sensors, and the more complicated a structure in which IDs are assigned to the ultrasonic sensors, respectively.

The foregoing is intended merely to aid in understanding the background of the present invention and therefore should not be interpreted to admit that the present invention falls within the purview of the related art that is already known to a person of ordinary skill in the art.

SUMMARY OF THE INVENTION

An objective of the present invention is to provide a switch module having a plurality of sensors that are connected to a plurality of switches, respectively, and then are integrally connected to a controller. The providing of this switch module reduces the number of communication channels used for the controller, simplifies wiring for connection to a vehicle sensor is simplified, and conveniently assign an ID to the vehicle sensor.

According to an aspect of the present invention, there is provided a system for controlling a vehicle sensor, the system including: a plurality of sensors provided in a vehicle; a switch module including a plurality of switches connected to the plurality of sensors, respectively, the plurality of switches being connected to the switch module through an integral line; a controller configured to control operation of each of the plurality of switches, the controller being connected to the switch module through the integral line and thus performing communication with the plurality of sensors, and assigning an ID to each of the plurality of sensors in a corresponding manner by selectively connecting each of the plurality of switches thereto, and a transmission and reception device connecting the switch module and the controller to each other, receiving a detection signal transmitted by each of the plurality of sensors; and transmitting the received detection signal to the controller, wherein the controller includes a communication channel connected to the transmission and reception device.

In the system, when starting the vehicle, the controller may turn on a switch connected to each of the plurality of sensors and then may assign the ID to the sensor, and the controller turns off the switch of the sensor to which the ID is assigned and, in this manner, may sequentially assign IDs to all the other sensors, respectively.

In the system, when the IDs are assigned to the plurality of sensors, respectively, the controller may turn on the plurality of switches, may transmit a diagnostic signal to each of the plurality of sensors, and thus may verify the IDs assigned to the plurality of sensors, respectively.

In the system, the controller may operate only the switch connected to the sensor required to operate.

In the system, the plurality of sensors mounted in the vehicle may be grouped into a plurality of groups, and the sensors in the same group may be connected to one switch module and then may be connected to the controller.

In the system, each of the sensors may be provided with three pins that are a first pin, a second pin, and a third pin, the first pin may serve as a communication pin connected to each of the switches, the second pin may serve as a power pin, and the third pin may serve as a grounding pin, and the respective power pins of the plurality of sensors may be connected to each other and then may be connected to the controller, and the respective grounding pins of the plurality of sensors may be connected to each other for grounding.

In the system, the switch module may include a physical switch or a multiplexer/demultiplexer (MUX/DeMUX).

According to another aspect of the present invention, there is a method of controlling the system for controlling a vehicle sensor, the method including: controlling operation of each of the switches; and assigning an ID to each of the sensors in a corresponding manner by selectively connecting each of the switches thereto.

The method may further include comparing the number of IDs respectively assigned to the sensors with the number of the sensors after the assigning of the ID to each of the sensors, wherein when the number of the IDs respectively assigned to the sensors is smaller than the number of the sensors, operation of the switch may be performed.

The method may further include: after the assigning of the ID to each of the sensors, operating all the switches; and verifying the assigned IDs by transmitting a diagnostic signal to each of the sensors.

The system for controlling a vehicle sensor according to the present invention includes the switch module having the plurality of switches that connect the plurality of sensors, respectively, to the controller through the integral line. The providing of the switch module achieves the following advantage. The controller can control the switch of the switch module when assigning the ID to each of the sensors, and thus the ID can be conveniently assigned to the vehicle sensor.

In addition, there is provided an advantage in that the switch connected to the sensor required to operate when the sensor operates can be controlled in such a manner that detection information of the sensor is correctly received.

In addition, there is provided an advantage in that with an integral line through which the switch module and the controller are connected to each other, the number of communication channels over each of which the controller receives a signal can be reduced, compared with a system for controlling a vehicle sensor in the related art. The reduction of the number of communication channels results in achieving cost reduction.

In addition, there is provided an advantage in that a sensor circuit can be simplified, compared with the system for controlling a vehicle sensor in the related art. The system in the related art has a function of automatically assigning an ID to a sensor. The simplification of the sensor circuit can reduce the size of the sensor.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 2 is a flowchart illustrating a method of controlling the system for controlling a vehicle sensor according to a second embodiment of the present invention.

DETAILED DESCRIPTION OF THE INVENTION

Figure 1:
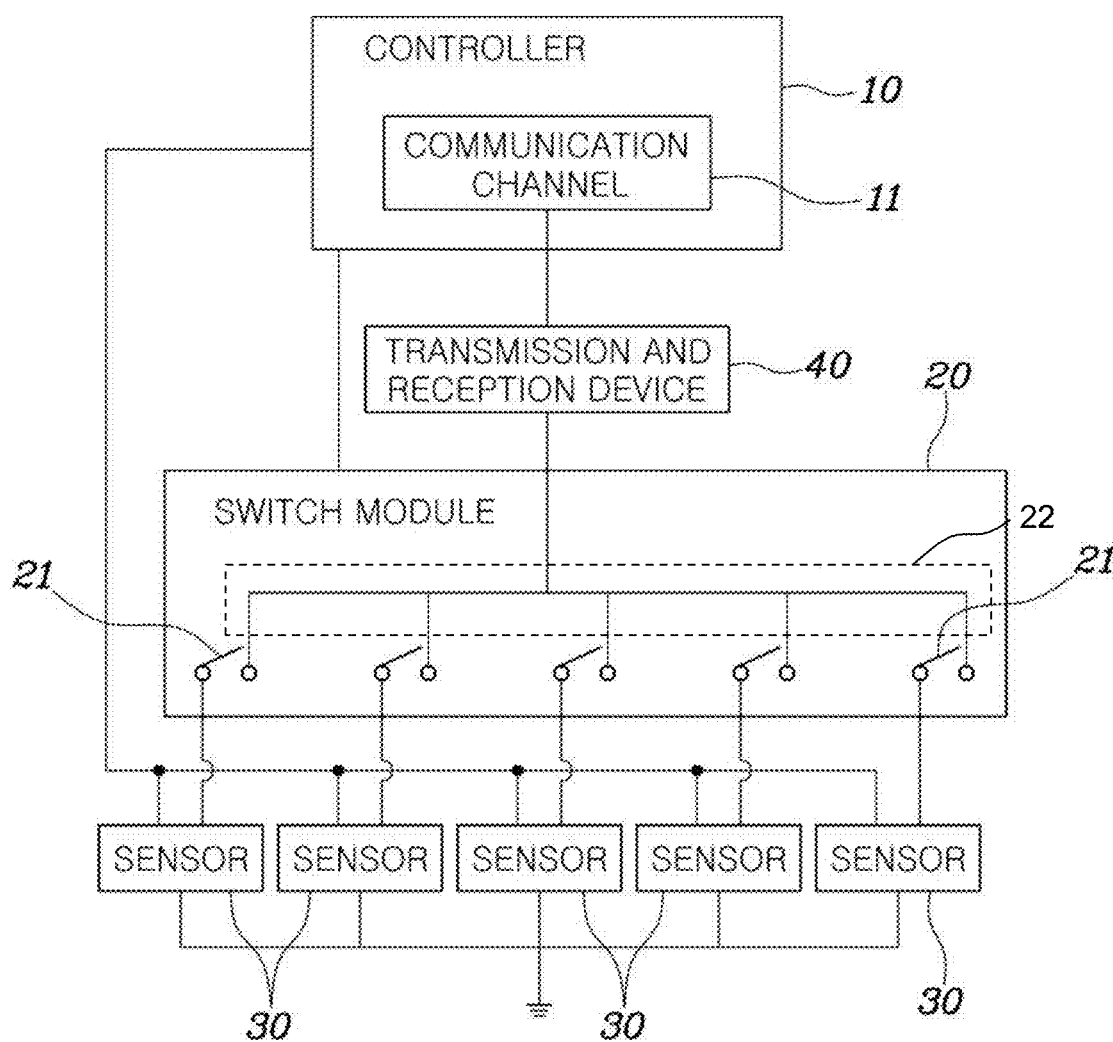
FIG. 1 is a view illustrating a configuration of a system for controlling a vehicle sensor according to a first embodiment of the present invention.

An exemplary embodiment of the present invention that is disclosed in the present specification will be described in terms of specific structures and functions for the purpose of illustration. However, the present invention may be practiced in various forms and should not be construed as being limited to the exemplary embodiment described in the present specification.

Various modifications may be made in various ways to the exemplary embodiment of the present invention. The exemplary embodiment will be described in detail below with reference to the accompanying drawings. This description of the exemplary embodiment is not intended to limit the present invention thereto. It should be understood that an alternative, a modification, an equivalent, or a substitution, when included within the nature and gist of the present invention falls within the scope of protection of the claimed invention.

The terms "first", "second", and so on may be used for description of various constituent elements, but do not impose any limitation on the meanings of the constituent elements. These terms are only used to distinguish one constituent element from another. For example, a first constituent element may be termed a second constituent element without departing from the scope of the claimed invention. Likewise, the second constituent element may also be termed the first constituent element.

It should be understood that a constituent element, when referred to as being "coupled to" or "connected to" a different constituent element, may be directly coupled to or directly connected to the different constituent element or may be coupled to or connected to the different constituent element with an intervening constituent element interposed therebetween. By contrast, it should be understood that a constituent element, when referred to as being "directly coupled to" or "directly connected to" a different constituent element, is coupled to or connected to the different constituent element without any intervening constituent element interposed therebetween. The same is true for expressions describing a relationship between constituent elements. For example, expressions such as "between" and "directly between" and expressions such as "adjacent to" and "directly adjacent to" should also be construed in the same manner.

The terms used throughout the present specification are only for describing the exemplary embodiment and are not intended to impose any limitation on the present invention. A noun in singular form has the same meaning as when used in plural form, unless it has a different meaning in context when used in plural form. It should be understood that the terms "comprise", "include", "have", and the like, when used in the present specification, each specify the presence of a feature, a number, a step, an operation, a constituent element, a component, and/or combinations thereof but do not preclude the possible presence or addition of one or more other features, integers, steps, operations, constituent elements, components, and/or combinations thereof.

Unless otherwise defined, each of all the terms used throughout the present specification, including technical or scientific terms, has the same meaning as is normally understood by a person of ordinary skill in the art to which the present invention pertains. The term as defined in commonly used dictionaries should be construed as having the same contextual meaning as that in the related art and, unless otherwise explicitly defined in the present specification, should not be construed as having an excessively implied meaning or a purely literal meaning.

The exemplary embodiment of the present invention will be described in detail below with reference to the accompanying drawings. The same reference numerals on the drawings refer to the same constituent element.

A controller 10 according to the exemplary embodiment of the present invention is realized by a nonvolatile memory (not illustrated) and a processor (not illustrated). The nonvolatile memory is configured to store data associated with an algorithm developed to control operation of each of the various components of a vehicle or with a software command for executing the algorithm. The processor is configured to perform a below-described operation using the data stored in the memory. The memory and the processor here may be realized as individual chips, respectively. Alternatively, the memory and the processor may be realized as a single integrated chip. The processor may be configured as a single processor or a plurality of processors.

FIG. 1 is a view illustrating a configuration of a system for controlling a vehicle sensor 30 according to a first embodiment of the present invention.

A preferred implementation example of the system for controlling the vehicle sensor 30 according to the first embodiment of the present invention will be described with reference to FIG. 1.

In order to be assigned an ID, a vehicle sensor 30 in the related art is configured using a bus method or a point-to-point method in which each vehicle sensor 30 is connected to the controller 10.

In the bus method, as many IDs as the number of pins connected to the vehicle sensors respectively, may be set. Thus, a problem with the bus method is that the more increased the number of vehicle sensors 30, the more increased the number of pins. A problem with the point-to-point method is that the more increased the number of vehicle sensors 30, the more increased the number of transmission and reception devices 40 that connect the vehicle sensors 30, respectively, and the more increased the number of communication channels 11 over each of which the controller 10 and the transmission and reception device 40 are connected to each other.

The system for controlling the vehicle sensor 30 according to the present invention includes a plurality of sensors 30, a switch module 20, and a controller 10. The plurality of sensors 30 is provided in a vehicle. The switch module 20 includes a plurality of switches 21 which are connected to the sensors 30, respectively, and to which the plurality of switches 21 are connected through an integral line 22. The controller 10 controls operation of each of the plurality of switches 21, is connected to the switch module 20 through the integral line 22 and thus performs communication with the plurality of sensors 30, and assigns an ID to each of the plurality of sensors 30 in a corresponding manner by selectively connecting each of the plurality of switches 21 thereto.

As illustrated in FIG. 1, the plurality of sensors 30 each of which detects an external target may be provided in the vehicle for being mounted therein. The plurality of sensors 30 may be connected to the plurality of switches 21, respectively, of the switch 20.

The integral line 22 may be provided in the switch module 20. Connection lines of the plurality of switches 21 that are individually connected to the plurality of sensors 30, respectively, are all integrated into the integral line 22.

The integral line 22 may be connected to the controller 10. Through the integral line 22, a detection signal of the sensor 30 may be transmitted to the controller 10.

Accordingly, the plurality of sensors 30 are connected individually to the plurality of switches 21, respectively. The plurality of switches 21 are connected to the controller 10, and thus the sensor 30 and the controller 10 may be connected to each other on a point-to-point basis.

In addition, when starting the vehicle, the controller 10 assigns IDs to the plurality of sensors 30, respectively, by controlling operation of each of the plurality of switches 21 of the switch module 20. When the plurality of sensors 30 to which the IDs, respectively, are assigned operate, the plurality of switches 21 may be caused to operate individually or to be all turned on to transmit the detection signals of the plurality of sensors 30 to the controller 10.

Accordingly, there is provided an advantage in that with one pin, the plurality of sensors 30 can be connected to the controller 10 and in that the IDs can be assigned to the plurality of sensors 30, respectively.

The system for controlling the vehicle sensor 30 may include a transmission and reception device 40. The transmission and reception device 40 provides a connection between the switch module 20 and the controller 10, receives the detection signal transmitted by the sensor 30, and transmits the received detection signal to the controller 10. A communication channel 11 that is connected to the transmission and reception device 40 may be included in the controller 10.

The transmission and reception device 40 is connected to the integral line 22 of the switch module 20 and transmits the detection signal from the sensor 30. In addition, the transmission and reception device 40 may be connected to the communication channel 11 included in the controller 10 and may transmit the detection signal received from the sensor 30 to the controller 10. Accordingly, through a message displayed on a display device or through audio output from a speaker in the vehicle, the controller 10 may alert a driver to the arrival of the detection signal of the sensor 30.

In the point-to-point method in the related art, as many transmission and reception devices 40 and communication channels 11 as the number of the sensors 30 are required. Thus, there is a problem in that a manufacturing cost is increased. However, according to the present invention, as many transmission and reception devices 40 and communication channels 11 as the number of switch modules 20 are required. Thus, there is provided an advantage in that manufacturing cost can be reduced.

An ID assignment method will be described below. When starting the vehicle, the controller 10 turns on the switch 21 connected to each of the plurality of sensors 30 and then assigns the ID to the sensor 30. Then, the controller 10 turns off the switch 21 of the sensor 30 to which the ID is assigned. In this manner, the controller 10 may sequentially assign IDs to all the other sensors 30, respectively.

When starting the vehicle, the controller 10 may operate the plurality of switches 21 connected to the plurality of sensor 30, respectively, in order to assign IDs to all the sensors 30, respectively, and then may assign the IDs to all the sensors 30, respectively.

When assigning an ID to the sensor 30, the controller 10 turns on only the switch 21 connected to the corresponding sensor 30 and turns off the switches 21 connected to all the other sensors 30, respectively. The controller 10 reiterates the processing described above until the IDs are assigned to all the sensors 30, respectively.

Accordingly, there is provided an advantage in that IDs can be stably assigned to the plurality of sensors 30, respectively, on a one-to-one basis, thereby avoiding confusion among all the sensors 30.

Subsequently, when the IDs are assigned to all the sensors 30, respectively, the controller 10 may turn on all the switches 21 and may verify the IDs respectively assigned to the sensors 30 by transmitting a diagnostic signal to each of all the sensors 30.

The controller 10 assigns the IDs to the sensors 30, respectively, and then needs to verify the IDs assigned to all the sensors 30, respectively. To this end, the controller 10 may turn on all the switches 21 and then may verify the assigned ID by transmitting the diagnostic signal to each of all the sensors 30.

Accordingly, the controller 10 may verify that the assigning of the IDs to the sensors 30, respectively, is completed.

When IDs are not assigned to all the sensor 30, respectively, the controller 10 may iteratively perform the ID assignment method described above.

The controller 10 may operate only the switch 21 that is connected to the sensor 30 that is required to operate.

The controller 10 may turn on only the switch 21 connected to the sensor 30 that is required to operate when the vehicle drives forward or backward. Thus, only the sensor 30 required to operate may operate.

Accordingly, there is an advantage in that data of the sensors 30 that are not necessary are not transmitted to the controller 10 thereby avoiding confusion among the plurality of sensors 30.

The sensors 30 mounted in the vehicle are grouped into a plurality of groups. The sensors 30 in the same group may be connected to one switch module 20 and then may be connected to the controller 10.

A total of four to twelve sensors 30 may be mounted in the front and rear of the vehicle in order to detect an external target. Adjacent sensors 30 may be grouped into one group and may be connected to the switch module 20. The adjacent sensors 30 in the same group may transmit data to the controller 10.

Accordingly, there is provided an advantage in that a circuit for the vehicle is more simplified. Furthermore, there is provided an advantage in that the switches 21 does not need many switch modules 20, thereby achieving cost reduction.

In each of the sensor 30 are provided with three pins that are a first pin, a second pin, and a third pin. The first pin serves as a communication pin that is connected to the switch 21. The second pin serves as a power pin. The third serves as a grounding pin. The respective power pins of the sensors 30 may be connected to each other and then may be connected to the controller 10. The respective grounding pins of the sensors 30 may be connected to each other for grounding.

As illustrated in FIG. 1, three pins are provided in each of the plurality of sensors 30. Each of the first pins is connected to the switch module 20. A signal may be transmitted to the controller 10 through the first pin. All the sensors 30 may be connected to the second pins, respectively, and then may be connected to the controller 10. Electric power may be supplied through the second pins. All the sensors 30 may be connected to the third pins for grounding, respectively.

Accordingly, the sensor 30 may be configured with only three pins. Thus, there is provided an advantage in that cost reduction can be achieved.

The switch module 20 may include a physical switch 21 or a multiplexer/demultiplexer (MUX/DeMUX).

The switch 21 may be configured as a physical switch 21 or a semiconductor switch 21. The physical switch 21 operates physically under the control of the controller 10 and thus may be turned on/off. The semiconductor switch 21 operates according to physical properties of a semiconductor that are controlled with a control signal of the controller 10.

The semiconductor switch 21, when constituting the switch 21, needs to satisfy specifications for a communication physical layer in such a manner as not to cause a signal attenuation/delay or the like.

FIG. 2 is a flowchart illustrating a method of controlling the system for controlling sensor 30 for the vehicle according to a second embodiment of the present invention.

The method of controlling the system for controlling the vehicle sensor 30 according to the second embodiment of the present invention includes Step S10 of controlling operation of each of the switches 21 and Step S11 of assigning an ID to each of the sensor 30 in a corresponding manner by selectively connecting each of the switches 21 thereto.

The method of controlling the system for controlling the vehicle sensor 30 may further include Step S12 of comparing the number of IDs respectively assigned to the sensors 30 with the number of the sensors 30, after Step S11 of assigning the ID to each of the sensor 30. When the number of the IDs respectively assigned to the sensors 30 is smaller than the number of the sensors 30, Step S10 of controlling the operation of the switch 21 may be performed.

The method of controlling the system for controlling the vehicle sensor 30 may further include Step S13 of operating all the switches 21 and Step S14 of verifying the assigned IDs by transmitting the diagnostic signal to each of the sensors 30, after S13 and S14.

The specific embodiments of the present invention are described above with the accompanying drawings and it would be obvious to a person of ordinary skill in the art that various modifications and alterations are possibly made to the present invention without departing from the nature and gist of the present invention that is claimed in the following claims.

What is claimed is:

1. A system for controlling a vehicle sensor, the system comprising:
a plurality of sensors provided in a vehicle;
a switch module including a plurality of switches connected to the plurality of sensors, and an integral line connecting the plurality of switches;
a controller being connected to the integral line of a switch module to communicate with the plurality of sensors and configured to control operation of the plurality of switches, the controller assigning an ID to each of the plurality of sensors by selectively connecting each of the plurality of switches thereto; and
a transmission and reception device connecting the switch module and the controller to each other, receiving a detection signal transmitted by each of the plurality of sensors, and transmitting the received detection signal to the controller,
wherein the controller comprises a communication channel connected to the transmission and reception device.

2. The system of claim 1, wherein when starting the vehicle, the controller turns on a switch connected to each of the sensors, assigns the ID to the sensor, and turns off the switch of the sensor to which the ID is assigned to sequentially assign IDs to all the other sensors, respectively.

3. The system of claim 2, wherein when the IDs are assigned to the plurality of sensors, the controller turns on the plurality of switches, transmits a diagnostic signal to each of the plurality of sensors, and verifies the IDs assigned to the plurality of sensors.

4. The system of claim 2, wherein the controller operates only the switch connected to the sensor required to operate.

5. The system of claim 1, wherein the plurality of sensors mounted in the vehicle are grouped into a plurality of groups, and the sensors in a same group are connected to one switch module and then connected to the controller.

6. The system of claim 1, wherein each of the sensors are provided with three pins that are a first pin, a second pin, and a third pin, and
wherein the first pin serves as a communication pin connected to each of the switches, the second pin serves as a power pin, and the third pin serves as a grounding pin, and
wherein the respective power pins of the plurality of sensors are connected to each other and then are connected to the controller, and the respective grounding pins of the plurality of sensors are connected to each other for grounding.

7. The system of claim 1, wherein the switch module includes a physical switch or a multiplexer/demultiplexer (MUX/DeMUX).

8. A method of controlling the system of claim 1, the method comprising:

controlling operation of each of the switches; and assigning an ID to each of the sensors by selectively connecting each of the switches thereto.

9. The method of claim 8, further comprising:

comparing a number of IDs respectively assigned to the sensors with a number of the sensors after the assigning of the ID to each of the sensors, wherein when the number of the IDs respectively assigned to the sensors is smaller than the number of the sensors, operation of the switch is performed.

10. The system of claim 8, further comprising: after the assigning of the ID to each of the sensors, operating all the switches; and verifying the assigned IDs by transmitting a diagnostic signal to each of the sensors.

* * * * *